June 27, 1950          I. HARRISON          2,512,936

MINNOW BUCKET

Filed Feb. 10, 1948

Ivan Harrison
INVENTOR.

BY *Clarence A. O'Brien*
*and Harvey B. Jacobson*
Attorneys

Patented June 27, 1950

2,512,936

UNITED STATES PATENT OFFICE 2,512,936

MINNOW BUCKET

Ivan Harrison, Atoka, Okla.

Application February 10, 1948, Serial No. 7,421

2 Claims. (Cl. 43—56)

The present invention relates to certain new and useful improvements in what is believed to be a novel minnow bucket, a type which is expressly adapted to be used in preserving live minnows, and the like, while being transported from the home or elsewhere to a relatively distant fishing ground.

Stated with greater particularity, the invention has to do with a simple and practical bucket which is provided with aerating means, whereby to keep the minnows, or other bait, alive during the stated transportation. In reducing to practice a preferred embodiment of the invention I provide a so-called minnow bucket having facilities and provisions whereby a partial vacuum is created in the bucket, suction for the purposes being obtained by way of a hose which may be conveniently connected with an existing type manifold connection for windshield wipers such as is used in present day automobiles and equivalent motor vehicles.

Another object of the invention is to provide a simple and expedient aerating tube which is connected to and carried by the cover of the bucket and which has an adjustable inlet for feeding atmospheric air into the bucket, whereby to conveniently aerate the water in said bucket.

Another featured advantage characterizing the improved bucket has to do with the adoption and use of a rubber or equivalent flexible diaphragm which is so situated and clamped in the bucket that it allows the necessary suction to be created in the bucket, permits the entrance of vitalizing air and has the principal function that it automatically closes off the inlet of the suction hose adapter in case the bucket is capsized, whereby to prevent water in said bucket from entering the motor by way of said hose.

Other objects and advantages will become more readily apparent from the following description and the accompanying illustrative drawing.

Figure 2:
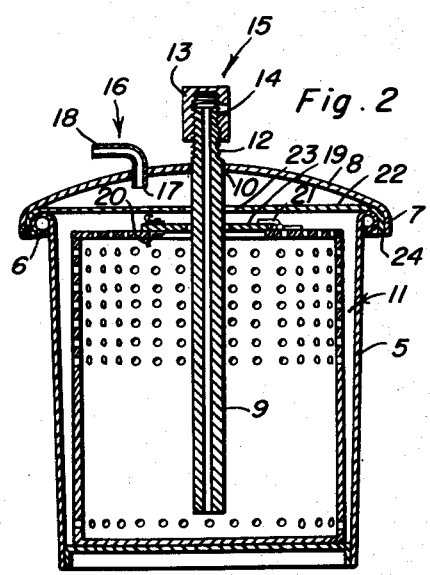
Figure 2 is a sectional view through the bucket, the section being on the line 2—2 of Figure 3.
Figure 4:
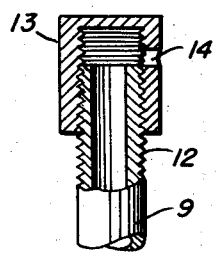
Figure 4 is a fragmentary sectional view of the air intake end of the aerating tube.

Reference is had first to Figure 2 wherein it will be seen that the bucket is denoted by the numeral 5. This is of any suitable capacity and is adapted to contain (not shown) the water and live bait or minnows, as the case may be. The mouth portion is provided with a rolled bead 6 to accommodate the skirt or lip 7 of the concavo-convex cover 8. The aerating tube 9 is soldered or otherwise connected centrally to the cover as at 10 and the depending portion thereof depends into a perforated or reticulated container fitted in the bucket. The upper end of the tube projects above the crown of the cover where it is screw threaded, as at 12. This accommodates the screw cap 13. The cap is provided with an air inlet port 14. This permits the cap to be adjusted to regulate the amount of atmospheric air which is sucked into the bucket when the partial vacuum is created within the confines of said bucket. The entire aerating device is denoted, as a unit, by the numeral 15.

The numeral 16 designates an adaptor which is in the form of a small elbow and one branch 17 is fastened to the cover and protrudes into the suction space of the bucket. The other branch 18 is adapted to accommodate a valve equipped hose 19 which is connectable with the aforementioned manifold connection means 20, that is the means which in turn is connected with the usual windshield wipers.

The minnow container 11 as before stated is in the form of a suitable cage and this is provided with a detachable lid 19 held partly in place by a detent 20 acting in conjunction with a suitable keeper gate 21. The lid is centrally apertured to permit convenient passage of the aerating tube 9, as is obvious.

The numeral 22 designates a circular sheet of rubber which functions as a diaphragm and this is centrally apertured as at 23 to allow the tube 9 to pass therethrough. Except for the center aperture, the diaphragm is otherwise imperforate. The outer marginal edge portion of the diaphragm, as at 24 is clamped fluidtight between the lip flange 7 and bead 6. As previously stated this diaphragm is in effect a check valve and should the bucket be capsized, the suction at the intake end 17 of the elbow 16 will suck the diaphragm in such a way that it will then cover the inlet and serve as a safety closing valve. More particularly, we will assume that the bucket is substantially full of water and that the weight or load of the water is then thrown against and bulges the diaphragm to the extent that it convexes it and forces it into the active suction range of said elbow 16, thus to provide the desired "check valve" effect.

Figure 1:
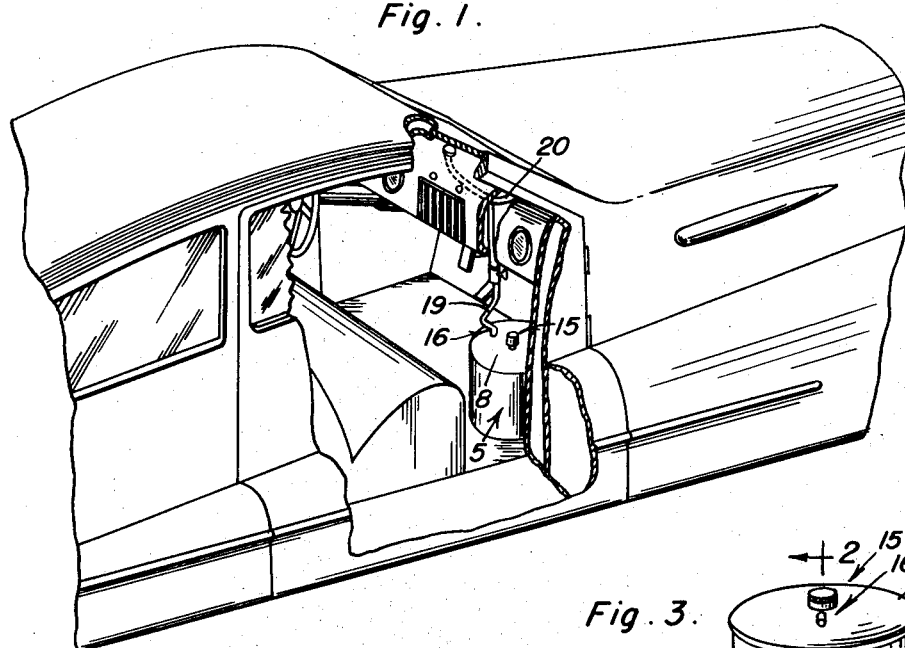
Figure 1 is a fragmentary perspective view showing a portion of an automobile, illustrating the minnow bucket in readiness for use, and showing, in a general way, how it may be hooked up with the aforementioned windshield manifold connection.
Figure 3:
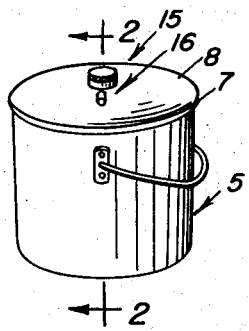
Figure 3 is a perspective view, on a smaller scale.

The bucket is hooked up for use as shown in Figure 1 of the drawing and when the motor is running the hose means 19 in conjunction with the adapter 16 will create a partial vacuum within the confines of the bucket. The vacuum will in turn produce the necessary suction to draw air through the tube 9 by way of the inlet port 14. Thus the air entering the water will bubble through the water and aerate same sufficiently to keep the minnows and live bait alive for a considerable length of time.

A careful consideration of the foregoing description in conjunction with the invention as illustrated in the drawing will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A life sustaining and preserving bait bucket for transporting live minnows and the like comprising a water containing bucket, said bucket being open at its top, a closing cover fitted removably over said open top, a diaphragm having its outer marginal edge portions securely clamped and sealed between the bucket and coacting marginal lip portion of the cover, said diaphragm having a central opening but being otherwise imperforate, an atmospheric air delivering and water aerating tube connected to said cover and depending through the opening in the diaphragm and into said bucket, the upper end of said tube projecting above said cover and having an adjustable air inlet including an adjustable screw cap with an air port provided in the cap, and an elbow attached to said cover and having one end in communication with the bucket by way of a central opening in said diaphragm and having its oposite end projecting above the cover and adapted to accommodate a suction hose.

2. A life sustaining and preserving bait bucket for transporting live minnows and the like comprising an open top water containing bucket, a reticulated live bait container arranged removably in said bucket, the open upper end portion of said bucket having an outstanding endless bead, a circular rubber diaphragm having its outer marginal edge seated on and rolled down over said bead, said diaphragm being stretched across the open top of the bucket and having a central opening but being otherwise imperforate, a cover having a marginal lip, said lip capping over said bead and serving to clamp the marginal edge portion of the diaphragm between the bead and lip, an elbow mounted in said cover and having one end situated in close proximity to but normally spaced from said diaphragm, having the opposite end projecting beyond the cover and adapted to accommodate the suction hose, an aerating tube connected centrally to said cover and having an inner end portion extending down through the aperture in said diaphragm and into said container, the upper end of said aerating tube projecting above said cover and having port means to introduce atmospheric air, under the influence of the suction created within the covered bucket and container.

IVAN HARRISON.

REFERENCES CITED

The following references are of record in the file of this patent:

UNITED STATES PATENTS

| Number | Name | Date |
| --- | --- | --- |
| 299,690 | Sherwood | June 3, 1884 |
| 770,763 | Lyhne et al. | Sept. 27, 1904 |
| 1,794,842 | Foster | Mar. 3, 1931 |
| 2,007,326 | Carpenter | July 9, 1935 |
| 2,044,081 | Kjellstrom | June 16, 1936 |
| 2,107,666 | Hechman | Feb. 8, 1938 |
| 2,303,757 | Pierson | Dec. 1, 1942 |